April 20, 1937.  W. H. LONGSTREET  2,078,148
PRESSURE FLUID GAUGE
Filed May 11, 1935
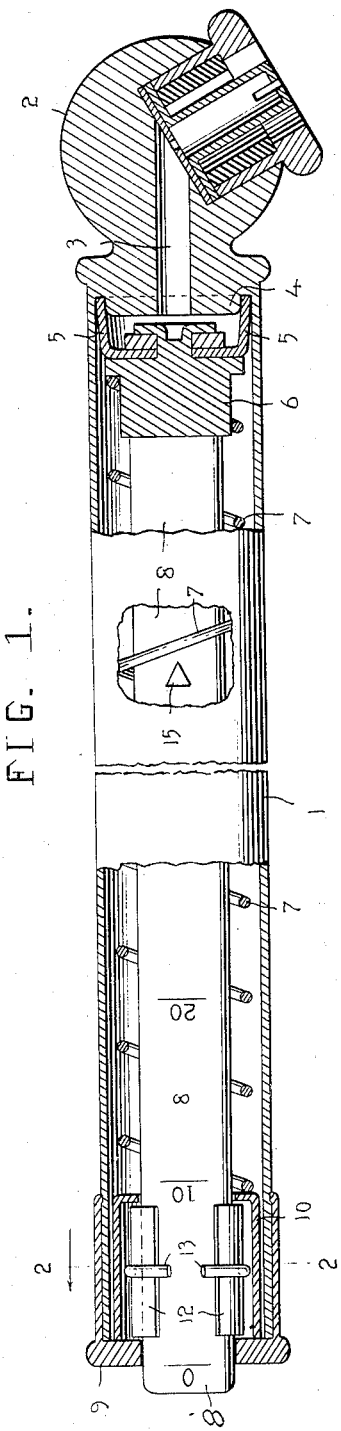
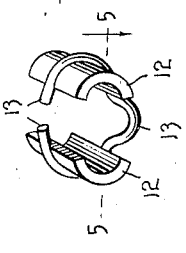
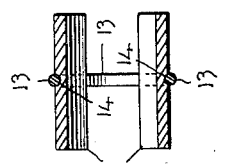
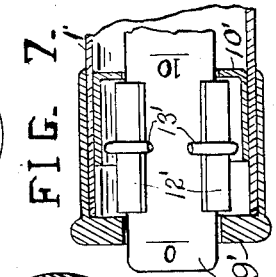
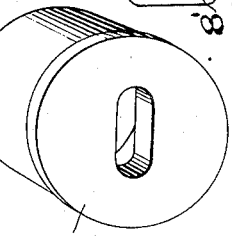
Inventor:
WALTER H. LONGSTREET
By Edgar M Kitchin
his Attorney.

Patented Apr. 20, 1937

2,078,148

UNITED STATES PATENT OFFICE 2,078,148

PRESSURE FLUID GAUGE

Walter H. Longstreet, Brooklyn, N. Y., assignor to Acme Air Appliance Company, Inc., Brooklyn, N. Y., a corporation of New York Application May 11, 1935, Serial No. 21,039

15 Claims. (Cl. 73—111)

This invention relates to improvements in pressure fluid gauges, and more particularly to the type set forth in the U. S. Letters Patent to Albert E. Carliss, No. 1,998,420, dated April 16, 1935.

Among the objects in view are simplicity and inexpensiveness of construction and durability and efficiency in operation.

A more detailed object is the damping of the movements of the gauge bar by friction means which, while effective in retaining the gauge bar in any given outstanding position, does not appreciably vary incident to wear, and, therefore, does not tend to vary the accuracy of calibration.

With these and further objects in view as will in part hereinafter become apparent and in part be stated, the invention includes in a pressure fluid gauge structure a friction plate and a spring independent of the plate and stressing the same into frictional contact with the bar.

The invention still further includes in such a combination a cup-like shell or housing for the plate disposed to prevent travel of the plate with the gauge bar.

The invention still further includes a tubular housing, a pressure-fluid actuated plunger therein, a return spring for the plunger, a gauge bar actuated by the plunger and projecting through one end of the housing, a closure cap for the housing surrounding the gauge bar, an internal cup also surrounding the gauge bar and providing a seat for the return spring, a friction plate extending along the gauge bar between the internal cup and the closure cap, so as to be held against longitudinal movement by the cap and cup, and resilient means stressing the friction plate against the gauge bar.

The invention also includes the structure just stated wherein a plurality of such friction plates is employed and a single spring engages the plates and stresses them against the gauge bar.

The invention in greater detail includes the structure stated in the last paragraph wherein the friction plates are recessed and the spring is a wire clip having its spring arms seated in the recesses of the plates.

The invention still further comprises certain other novel constructions, combinations, and arrangements of parts as subsequently specified and claimed.

In the accompanying drawing,—

Figure 1 is a sectional elevation of a pressure fluid gauge embodying the features of the present invention, the parts being shown on a scale enlarged relative to the popular sizes of such gauges as now marketed.

Figure 2 is a transverse section taken on the plane indicated by line 2—2 of Figure 1 and looking in the direction of the arrow.

Figure 3 is a detailed perspective view of the friction plates and spring clip detached.

Figure 4 is a perspective view of the end cap for the housing detached.

Figure 5 is a longitudinal section through the friction plates, the section being taken on the plane indicated by line 5—5 of Figure 3.

Figure 6 is a perspective view of the internal cup detached.

Figure 7 is a fragmentary, sectional elevation of the outer end portion of a slightly modified embodiment of gauge.

Referring to the drawing by numerals, 1 indicates a housing which is tubular and preferably cylindrical and closed at one end by an air chuck 2 of any approved and acceptable form, such, for example, as illustrated in the above-mentioned Carliss patent. The chuck 2 has a port 3 leading into the interior of the housing, and the housing is preferably formed at the inner terminal portion of port 3 with a cone frustum 4 having its inclined walls spaced from the wall of the housing so as to be engaged by the flexible skirt 5 of a plunger 6 located within the housing and stressed to its seat against the cone 4 by return spring 7. The cone arrangement 4 has as its object the assurance of maintaining the skirt 5 flexible and in contact with the surrounding inner surface of the wall of housing 1 so as to prevent leakage of fluid, such as compressed air, past the plunger 6, when the fluid enters through the port 3. The relative action between the cone 4 and skirt 5 is substantially that of the corresponding parts shown in the patent to Ellwood V. Cross, No. 1,978,990, dated October 30, 1934.

A gauge bar or rod 8 extends along and within the housing 1 and through the open end opposite the end having the air chuck 2. Bar 8 is preferably graduated to indicate and register the relative pressure of the fluid entering through port 3, and the bar merely rests endwise against the plunger 6, when the parts are in the position seen in Figure 1, so that the plunger may be returned to the seat and leave the gauge bar outstanding after a stroke of the plunger under the impulse of pressure fluid flowing in through the port 3.

The bar 8 may be of various cross sections, such as square or otherwise polysided, as shown in the pending application of Albert E. Carliss, Serial No. 622,427, filed July 14, 1932, or may be flat with rounded edges as seen in the accompanying drawing.

A cap 9 is mounted on the otherwise open end of the housing 1 to close the same, and may be secured to the housing in any appropriate manner, such as by being pressed thereon with a driven fit, and the end of cap 9 is formed with an opening corresponding to the cross section of and slightly larger than the bar 8 to allow the bar to extend through the cap and move freely therethrough. Just inward of the cap 9 within the housing 1 is arranged an internal cup 10 reversed in its relation so far as its open end is concerned with respect to the cap 9. Cup 10 surrounds the bar 8 and is provided with an opening or slot 11 in its inner end corresponding in cross section with and slightly larger than the bar 8 for allowing the bar to slide freely through the cup. The return spring 7 for plunger 6 surrounds the bar 8 and is seated against the cup 10 so as to resiliently stress the cup into contact with the inner surface of cap 9. Of course, spring 7 is properly calibrated to resist movement or thrust of plunger 6 under pressure fluid entering through port 3, so that, when the plunger 6 moves under such pressure outward or toward the cup 10, such movement will be proportional to the pressure and the amount of pressure will be indicated by the calibration on those parts of bar 8 caused to move beyond cap 9 and thus be exposed outside of housing 1. For purposes of facility of descriptive reference, the cap 9 may be considered a part of housing 1, and is only an additional part as a matter of facility of assemblage of the internally located parts.

Frictionally engaging each of the longitudinal margins or edges of the bar 8 is a friction plate or brake shoe 12, each of which may be of any appropriate transverse contour to insure maximum frictional surface of contact in a minimum distance, and, when the longitudinal edges of bar 8 are rounded as seen in Figure 2, the plates 12 are correspondingly rounded. A spring clip 13 is arranged with its spring arms spaced apart and engaging the plates 12 so as to resiliently pull or stress them toward each other, and, therefore, toward the bar 8 which is interposed between the plates 12. Each of the plates 12, as best seen in Figure 5, is provided with a groove 14 preferably approximately midway of its length opening outward and into which groove the respective arm of the spring 13 extends, whereby the spring is kept from having any relative shifting movement along the plates 12. Each of plates 12 is preferably of a length equal approximately to the internal length of cup 10, so that the plates 12 and their spring 13 can not move longitudinally with the bar 8, as the plates are intercepted in their outward movement by the end of cap 9 and in their inward movement by the end of cup 10.

Thus, the bar 8 is effectively frictionally held by plates 12 at any given position and is at the same time free to be thrust outward by movement of plunger 6, or thrust inward by manual operation against the outer end of the bar.

The operation of the structure will be understood from the foregoing, but may be briefly stated as follows:

The parts being in the position seen in Figure 1, chuck 2 is applied to a source of fluid pressure, as, for instance, the valve of a pneumatic tire, whereupon the inflowing fluid through port 3 forces the plunger 6 outward along housing 1 to an extent proportional to the amount of pressure, so that the gauge bar 8 moves out and discloses the registered pressure, preferably by numerals indicating pounds and marked on the faces of the bar 8. As inspection of the bar is sometimes not convenient while the gauge is contacting the valve stem, the operator usually removes the gauge therefrom to bring the gauge up to where it can be more readily viewed. As the pressure is thus relieved within the housing 1 and the pressure fluid permitted to escape through port 3, the spring 7 causes the plunger 6 to return to its seat and the skirt 5 to be spread or to tend to spread under the action of cone 4 tightly against the inner surface of the housing 1, which insures non-leakage in the next operation even though a considerable period of time elapses before the gauge is used again. The gauge bar, however, does not return with the return movement of the plunger but remains outstanding to give the operator time for inspection, after which the operator striking or engaging the outer end portion of the plunger moves it by manually applied force back to the position seen in Figure 1 against the frictional resistance of the plates 12. The plates 12 may be of any of various acceptable and appropriate materials, such, for instance, as the hard fiber popularly employed for electrical insulation.

As set forth in the pending application of Albert E. Carliss above identified, it is preferable to provide the bar 8 with lateral lugs or extensions 15 spaced from the end of the bar contacted by plunger 6 a distance equal to or slightly greater than the length of the spring 7 when the latter is practically or completely compressed, so that the lugs 15 will contact with the bottom of cup 10 and thus limit the outward travel of bar 8, and correspondingly limit the thrust of the plunger 6. Accordingly, the plunger can not under an excess impulse effect such a thrust as to rupture or otherwise injure the spring 7.

It will be observed particularly from Figure 1 of the drawing that the friction plates 12 are shown as slightly shorter than the space between the end of the closure cap 9 and the opposing end of the internal cup 10, a space being shown at each end of each plate 12. This space is somewhat exaggerated from the actually required spacing in practice for purposes of clearness of illustration, it being only necessary to have the length of the plates 12 such that there is no danger or likelihood of the plates 12 being gripped endwise between the end of cup 10 and the opposing end of cap 9. Such gripping action, even if only slight, would tend to frictionally resist lateral play of the plates 12 and proportionally reduce and vary the effective clamping action of the plates 12 against bar 8 under the pressure of the spring 13. So long as entire freedom from such gripping action is insured, the plates 12 may be practically of the same length as the space between the opposite ends of the cap 9 and cup 10.

It should also be understood that the cup 10 is shown in Figure 1 as resting against the closed end of the closure cap 9 as a matter of convenience of assemblage, and any other form of mounting for the cup 10 that will enable the cup to carry the load of spring 7 without distributing any part of it to the friction plates 12 will serve. To that end, I have illustrated in Figure 7 a slightly modified embodiment in which the parts are the same as those of Figure 1 except for the fact that the internal cup is connected directly to the gauge housing. Accordingly, the same description is applicable, and, for convenience of identification, the same reference numerals are employed and each provided with a prime mark to indicate the modification. The cup 10' is inserted with a driven fit into the cylinder making up the body 1'. It should be understood that the cup may be otherwise connected to the body by any of various readily available means. Also, in Figure 7 the cover cap 9' is shown as not provided with the flange and groove connection to the body, as shown in Figure 1, since the use of such flange and groove connection is optional, and, where a non-revolving cap is acceptable, it has been found amply adequate for practical purposes to apply the closure cap to the gauge body by a driven fit.

What is claimed is:—

1. In fluid pressure gauges, the combination, with a housing, of a gauge bar movable through the end thereof, a friction plate engaging the gauge bar, means preventing movement of the plate with the bar, and resilient stressing means independent of the plate and engaging the plate and stressing the plate toward the bar into frictional contact therewith.

2. The combination as claimed in claim 1 wherein the bar has a longitudinal edge and the plate engages said edge.

3. The combination as claimed in claim 1 wherein the bar has a plurality of longitudinal edges and a plurality of said plates is provided, one engaging each edge of the bar.

4. In pressure fluid gauges, the combination, with a housing, a gauge bar having a portion movable through the end of the housing into and out of the housing, and a closure cap for the housing formed with an opening through which said gauge bar extends, of an internal cup arranged within the housing and facing in an opposite direction from the cap and surrounding the gauge bar and having an opening through which the gauge bar extends, pressure fluid actuated means for shifting the gauge bar, a friction plate within the internal cup engaging the gauge bar for resisting movement thereof, the cap and cup aforesaid being constructed to resist movement of the plate with the gauge bar, and means for resiliently stressing said plate into frictional contact with the gauge bar.

5. The combination as claimed in claim 4 wherein the friction plate is of a length substantially equal to the length of the space between the opposite ends of the cover cap and the internal cup.

6. The combination as claimed in claim 4 wherein the resilient stressing means is a spring clip having an arm encircling the plate and exerting spring pressure thereon toward the bar.

7. The combination as claimed in claim 4 with a return spring for the gauge bar actuating means arranged with the spring seated on the internal cup.

8. In pressure fluid gauges, the combination, with a housing and a longitudinally movable gauge bar therein, of a friction plate engaging the bar for resisting movement thereof, a spring separate from the plate and engaging the same for stressing the plate into frictional contact with the bar, the plate being formed with a recess in which the spring lies for retaining the spring against independent movement in the direction of the length of the plate, and means for preventing longitudinal movement of the plate relative to the housing.

9. The combination as claimed in claim 8 wherein a plurality of said friction plates is provided and the spring is a spring clip having arms surrounding the plates and lying in the recesses thereof.

10. In pressure fluid gauges, the combination, with a housing, a gauge bar movable longitudinally therein, and pressure fluid actuated means for moving the bar, of friction plates spaced apart and engaging the bar for frictionally resisting movement thereof, each having a transverse groove-like recess, a spring clip enclosing said plates and lying in the recesses thereof, and means in the length of the housing for engaging the ends of the plates to limit the plates against movement with the gauge bar.

11. In fluid pressure gauges, the combination, with a housing, of a gauge bar movable through the end thereof, a friction plate engaging the gauge bar, resilient stressing means independent of the plate and engaging the plate and stressing the plate toward the bar into frictional contact therewith, means on said housing cooperating with said friction plate to prevent movement thereof in one direction, and a cup within the housing and surrounding the bar, said cup having its end located to be engaged by the said plate to prevent movement thereof with the bar in the other direction.

12. In a fluid pressure gauge, the combination with a housing, a gauge bar movable longitudinally therein, and pressure fluid actuated means for moving the bar, of a friction plate contacting the bar and stressing means for maintaining the plate in frictional contact with the bar, limiting means for limiting said plate against longitudinal movement with said bar in one direction, means on said housing for resisting relative movement of the limiting means in one direction, and separate means in said housing for resisting movement of the limiting means in the other direction.

13. The combination as claimed in claim 12 wherein said limiting means for the plate comprises means surrounding the plate and plate stressing means, and the means for resisting movement of the limiting means in one direction comprises a compression spring having one end engaging said fluid pressure operated member, and the other end engaging said plate limiting means.

14. The combination as claimed in claim 12 wherein the limiting means for the friction plate comprises a cup enclosing the plate and stressing means having an opening through which the gauge bar passes, and the separate resisting means comprises a spring within the housing for resisting movement of the limiting means in one direction.

15. The combination as claimed in claim 12 wherein the separate means includes a spring within the housing having a seat on said limiting means, and the plate limiting means comprises a sleeve-like member having a flanged end constituting said seat for the spring and a stop shoulder for the plate.

WALTER H. LONGSTREET.